(12) United States Patent
Spruit et al.

(10) Patent No.: US 12,373,412 B2
(45) Date of Patent: *Jul. 29, 2025

(54) METHOD AND SYSTEM FOR OPTIMIZATION OF FACETED SEARCH

(71) Applicant: OPEN TEXT CORPORATION, Waterloo (CA)

(72) Inventors: Caroline Spruit, Rotterdam (NL); Petr Olegovich Pleshachkov, Nootdorp (NL)

(73) Assignee: OPEN TEXT CORPORATION, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,231

(22) Filed: Apr. 3, 2023

(65) Prior Publication Data

US 2023/0244648 A1    Aug. 3, 2023

Related U.S. Application Data

(63) Continuation of application No. 16/711,014, filed on Dec. 11, 2019, now Pat. No. 11,620,268, which is a (Continued)

(51) Int. Cl.
*G06F 16/20* (2019.01)
*G06F 16/22* (2019.01)
(Continued)

(52) U.S. Cl.
CPC ........ *G06F 16/2228* (2019.01); *G06F 16/248* (2019.01); *G06F 16/81* (2019.01); *G06F 16/838* (2019.01)

(58) Field of Classification Search
CPC .... G06F 16/2228; G06F 16/81; G06F 16/838; G06F 16/248; G06F 16/338; G06F 16/9537; G06F 16/951
See application file for complete search history.

(56) References Cited

U.S. PATENT DOCUMENTS 6,519,586 B2 * 2/2003 Anick ................. G06F 16/9538
707/999.005
8,024,324 B2 * 9/2011 Amitay ................. G06F 16/334
707/723
(Continued)

FOREIGN PATENT DOCUMENTS

WO    WO2009/055465 A2 *  4/2009
WO    WO2009055465       *  4/2009

*Primary Examiner* — Daniel A Kuddus
(74) *Attorney, Agent, or Firm* — Sprinkle IP Law Group

(57) ABSTRACT

In general, embodiments of the technology relate to a method for multipath searching. The method includes generating a multipath index and using the multipath index to service a request. Generating the multipath index includes obtaining a main path, a first subpath and a plurality of additional subpaths from a multipath index definition, identifying documents that include the first subpath, obtaining values for the first subpath and the plurality of additional subpaths from the documents, creating subpath index entries for the documents that include the values for the additional subpaths, and populating the multipath index with the created subpath index entries. The subpath index entries in the multipath index can be associated with keys corresponding to values associated with the first subpath.

22 Claims, 9 Drawing Sheets

Related U.S. Application Data continuation of application No. 15/281,207, filed on Sep. 30, 2016, now Pat. No. 10,521,408.

(51) Int. Cl.
*G06F 16/248* (2019.01)
*G06F 16/81* (2019.01)
*G06F 16/838* (2019.01)

(56) References Cited

U.S. PATENT DOCUMENTS

| | | | |
|---|---|---|---|
| 8,244,754 B2* | 8/2012 | Betzler | G06F 16/00 707/769 |
| 8,645,388 B1* | 2/2014 | Bueche | G06F 16/27 707/742 |
| 8,903,829 B1* | 12/2014 | Bueche | G06F 16/81 707/742 |
| 9,547,714 B2* | 1/2017 | Ambasta | G06F 16/93 |
| 2003/0077573 A1* | 4/2003 | Paris | G01N 33/6896 435/4 |
| 2003/0097365 A1* | 5/2003 | Stickler | H04N 21/84 |
| 2003/0105746 A1* | 6/2003 | Stickler | G06F 16/93 |
| 2008/0133473 A1* | 6/2008 | Broder | G06F 16/319 |
| 2009/0327271 A1* | 12/2009 | Amitay | G06F 16/334 707/999.005 |
| 2014/0074845 A1* | 3/2014 | Dimassimo | G06F 16/338 707/739 |
| 2014/0379728 A1* | 12/2014 | Ambasta | G06F 16/951 707/742 |
| 2015/0006500 A1* | 1/2015 | Ambasta | G06F 16/319 707/706 |
| 2016/0179933 A1* | 6/2016 | Dimassimo | G06F 16/3325 707/711 |

* cited by examiner

METHOD AND SYSTEM FOR OPTIMIZATION OF FACETED SEARCH

CROSS-REFERENCE TO RELATED APPLICATIONS

This application is a continuation of, and claims a benefit of priority under 35 U.S.C. 120 of the filing date of U.S. patent application Ser. No. 16/711,014, filed Dec. 11, 2019, issued as U.S. Pat. No. 11,620,268, entitled "METHOD AND SYSTEM FOR OPTIMIZATION OF FACETED SEARCH," which is a continuation of, and claims a benefit of priority under 35 U.S.C. 120 of the filing date of U.S. patent application Ser. No. 15/281,207 filed Sep. 30, 2016, issued as U.S. Pat. No. 10,521,408, entitled "METHOD AND SYSTEM FOR OPTIMIZATION OF FACETED SEARCH," both of which are incorporated herein by reference.

BACKGROUND

One method for accessing stored content is to use an index (or indices). An index may provide direct access to a particular document(s), for example, in response to a query without requiring traversal of all of the stored content.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-7, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for improving the performance of processing search requests. More specifically, embodiments of the technology relate to modifying a multipath index such that additional content from one or more subpaths may be stored directly in the index. The subpaths stored in the multipath index may be conditional subpaths and facet subpaths, where the facet subpaths include content from the corresponding documents that are indexed by the multipath index. By storing additional content related to one or more facet subpaths in the multipath index, the query processing engine may be able to service various search requests using only content stored in the multipath index. Said another way, the query processing engine may be able to service a search request without retrieving an entire document(s) from storage.

Figure 1:
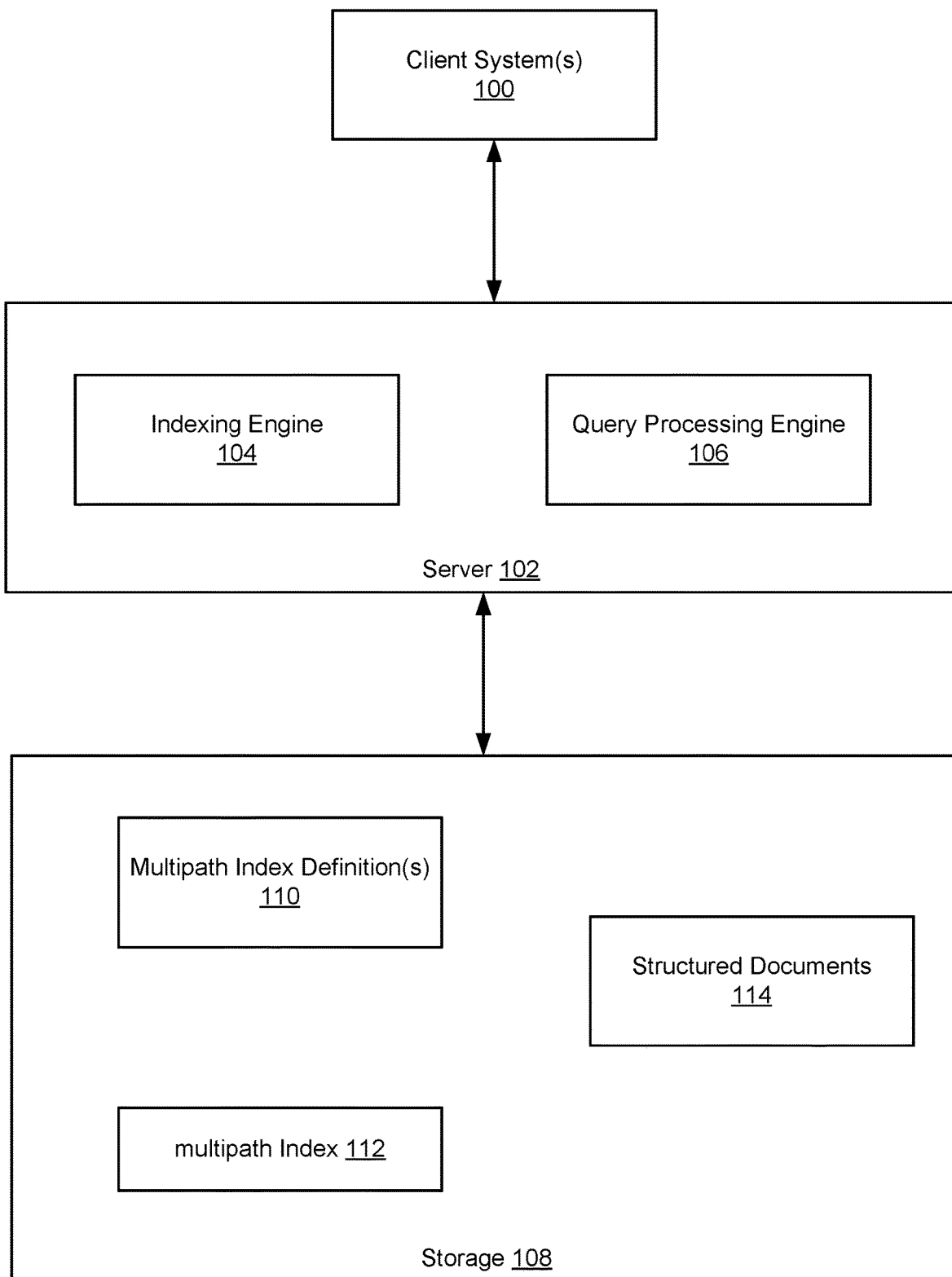
FIG. 1 shows an exemplary system in accordance with one or more embodiments of the technology.

FIG. 1 shows an exemplary system in accordance with one or more embodiments of the technology. The system includes one or more client systems (100), a server (102), and storage (108). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, each client system (100) corresponds to any computing system (see e.g., FIG. 7) that includes functionality to issue search requests (also referred to as queries) to the server (102) and to receive a corresponding response(s) (as referred to as final results, see e.g., FIG. 6) from the server after the search request has been serviced.

Figure 4:
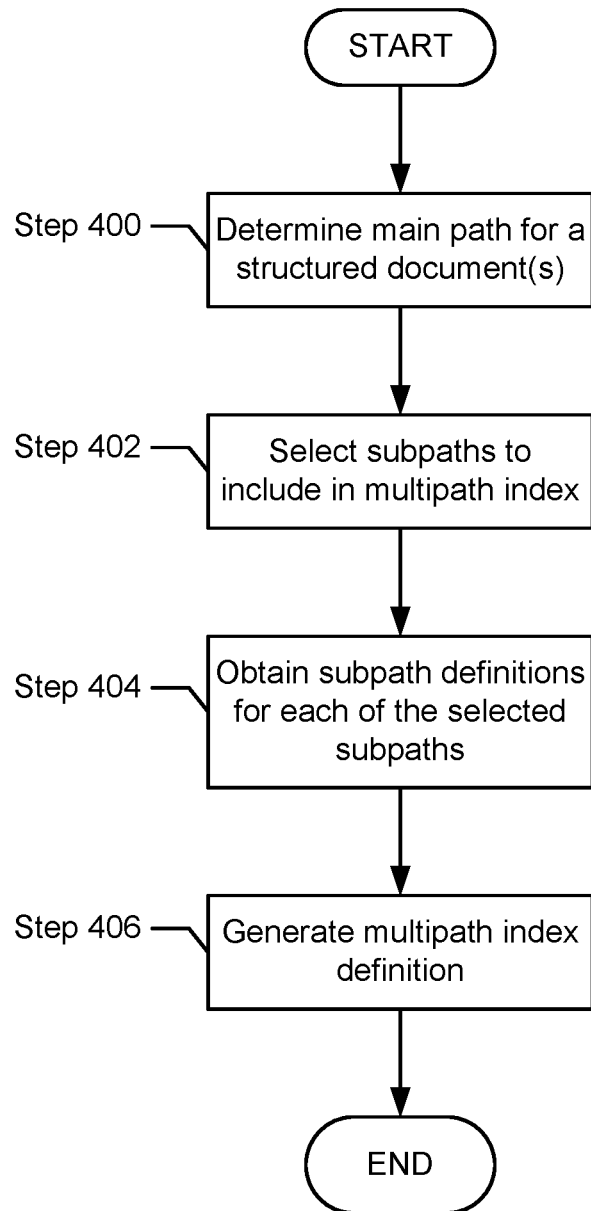
FIG. 4 shows a flowchart for generating a multipath definition in accordance with one or more embodiments of the technology.
Figure 5:
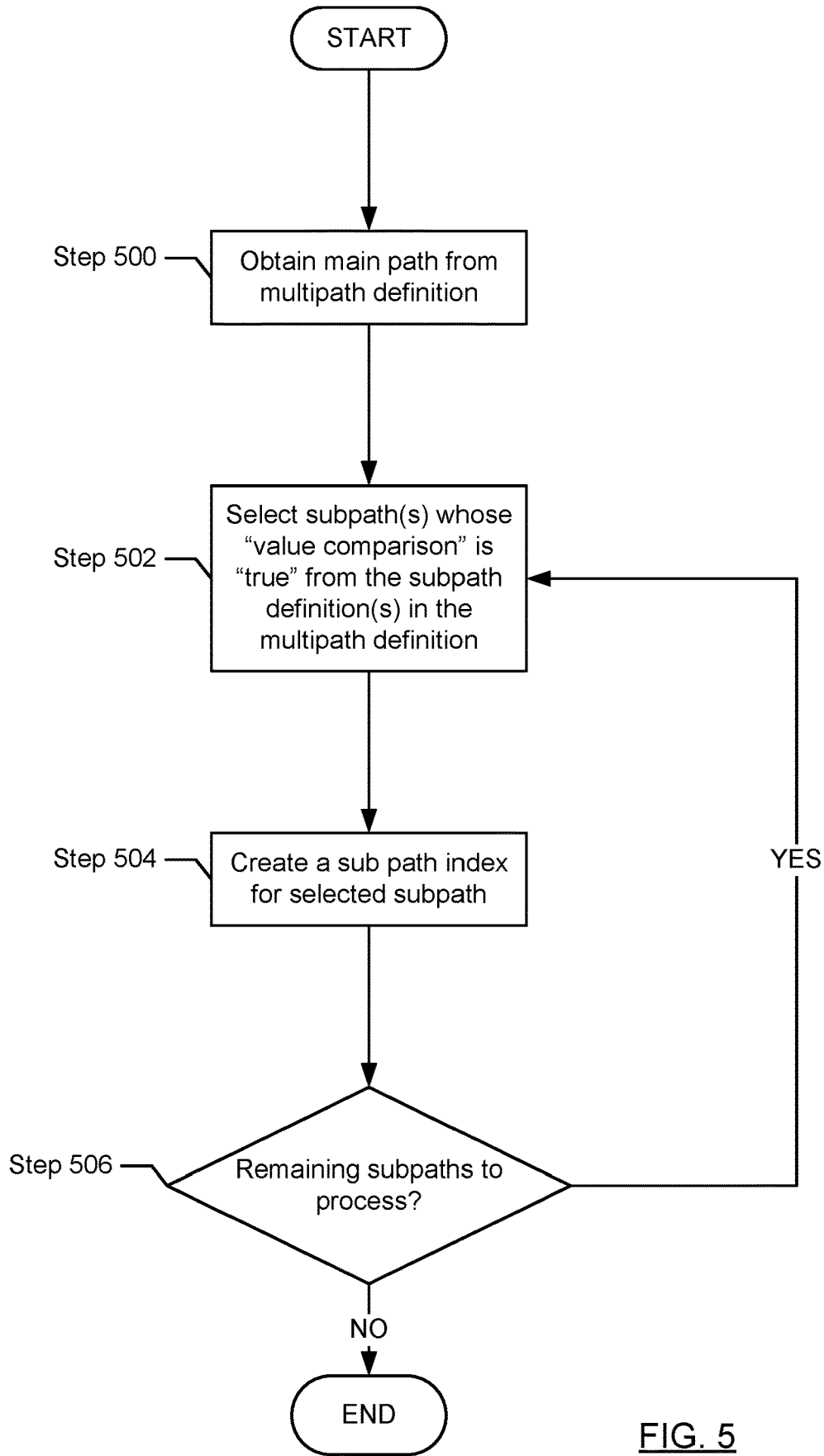
FIG. 5 shows a flowchart for generating a multipath index in accordance with one or more embodiments of the technology.
Figure 6:
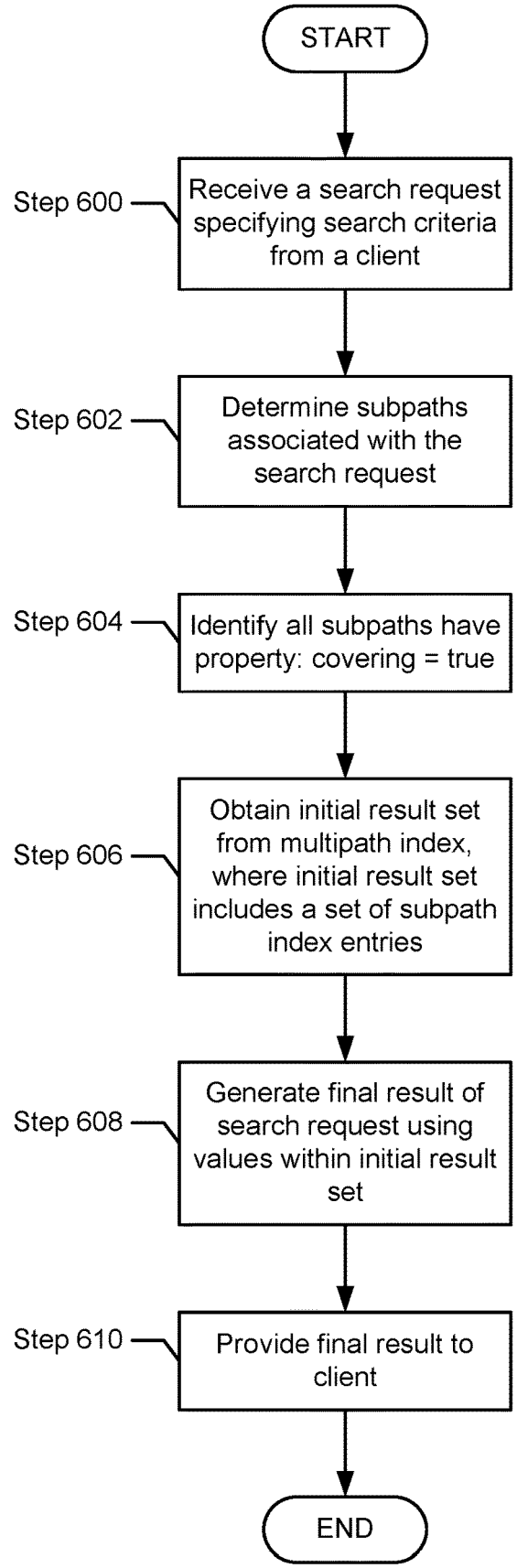
FIG. 6 shows a flowchart for processing a search request in accordance with one or more embodiments of the technology.

Continuing with the discussion of FIG. 1, the server (102) includes functionality to perform all or a portion of the methods shown in FIGS. 4-6. The server may also include functionality to perform various actions (e.g., read, write, delete, modify, send, etc.) on the structured documents (114) (or portions thereof) stored in the storage (108).

In one embodiment of the technology, the server (102) includes a query processing engine (106) and an indexing engine (104). In one embodiment of the technology, the indexing engine (104) is configured to: (i) obtain and manage one or more multipath index definitions (110) and (ii) generate and manage the multipath index. See e.g., FIGS. 4-5. In one embodiment of the technology, the query processing engine (106) is configured to request search requests and to service the search requests. See e.g., FIG. 6.

Figure 7:
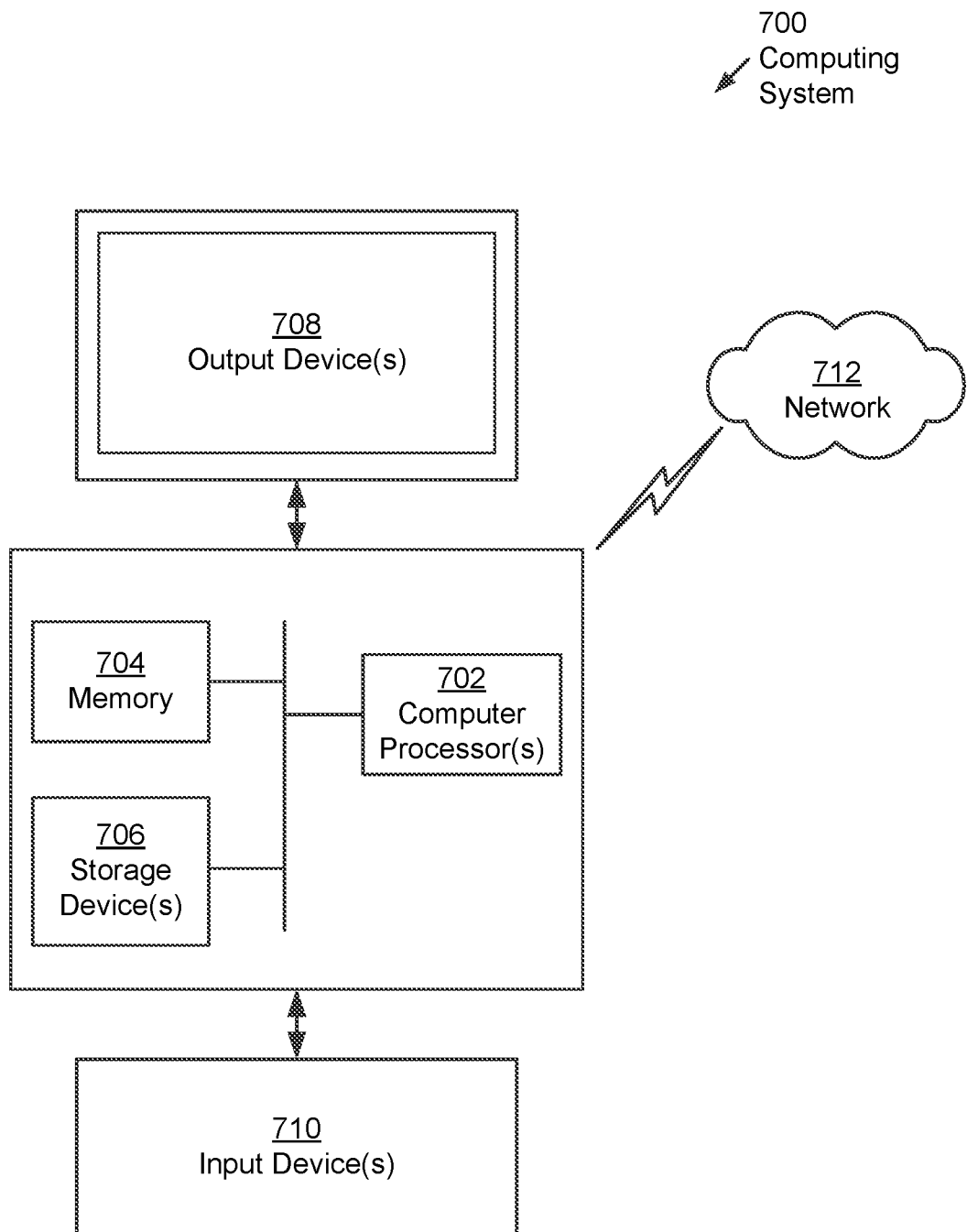
FIG. 7 shows a computing system in accordance with one or more embodiments of the technology.

The server (102) may be implemented using one or more computing systems (see e.g., FIG. 7). Additional detail about the operation of the server (and components thereof) is provided in FIGS. 4-6.

In one embodiment of the technology, the storage (108) includes persistent storage (e.g., solid state storage, magnetic storage, optical storage, any other type of persistent storage or any combination thereof) in which data are stored.

Continuing with the discussion of the storage, the storage may store data using any known or subsequently discovered mechanism. The following describes various examples of the mechanisms that may be used to store data. The examples are not intended to limit the technology. In a first example, the storage (108) may be a set of magnetic hard disks. In a second example, the storage (108) may be implemented using a computer cluster that is executing a distributed file system. In a third example, the storage (108) may be implemented using a network file server and one or more block-storage devices (i.e., as a Storage Area Network).

In one embodiment of the technology, one or more multipath index definitions (110) are stored in the storage (108). Additional detail about the multipath index definition is provided in FIGS. 2A-2B. In addition, the storage (108) may also store one or more multipath indices (112). Additional detail about the multipath indices is provided in FIGS. 3A-3C.

In one embodiment of the technology, the storage may also include one or more structured documents (118). An example of a structure document is an eXtensible Markup Language (XML) document. In one embodiment of the invention, a structured document may be indexed using a main path and one or more subpaths, where each of the subpaths is defined relative to the main path. Further, each structured document is associated with a node identifier, which may be used to directly access the structure document from storage. In addition, one or more of the subpaths in the structure document may also be associated with a node identifier, which enable direct access of the content associated with the subpath. See e.g., Example 1.

The technology is not limited to the architecture of the system shown in FIG. 1.

Example 1: Structured Document

The following is an example of a structured document. The example is not intended to limit the scope of the technology.

```
<baseball>
   <master>
      <player>
         <playerid>aardsdaO1</playerid>
         <birthyear>1981<!birthyear>
         <birthcounttry>USA</birthcounttry>
         <birthstate>CO<lbirthstate>
         <birthcity>Denver<lbirthcity>
         <namefirst>David</namefirst>
         <namelast>Aardsma</namelast>
      </player> ....
   </master>
</baseball>
```

In this example, the structured document includes a main path: "/baseball/master/player" and the following subpaths <playerid>, <birthyear>, <birthcounttry>, <birthstate>, <birthcity>, <namefirst>, and <namelast>. Further, as shown in the above example, each of the subpaths is associated with content. For example, for subpath <playerid>, the corresponding content is "aardsdaO1."

Figure 2A:
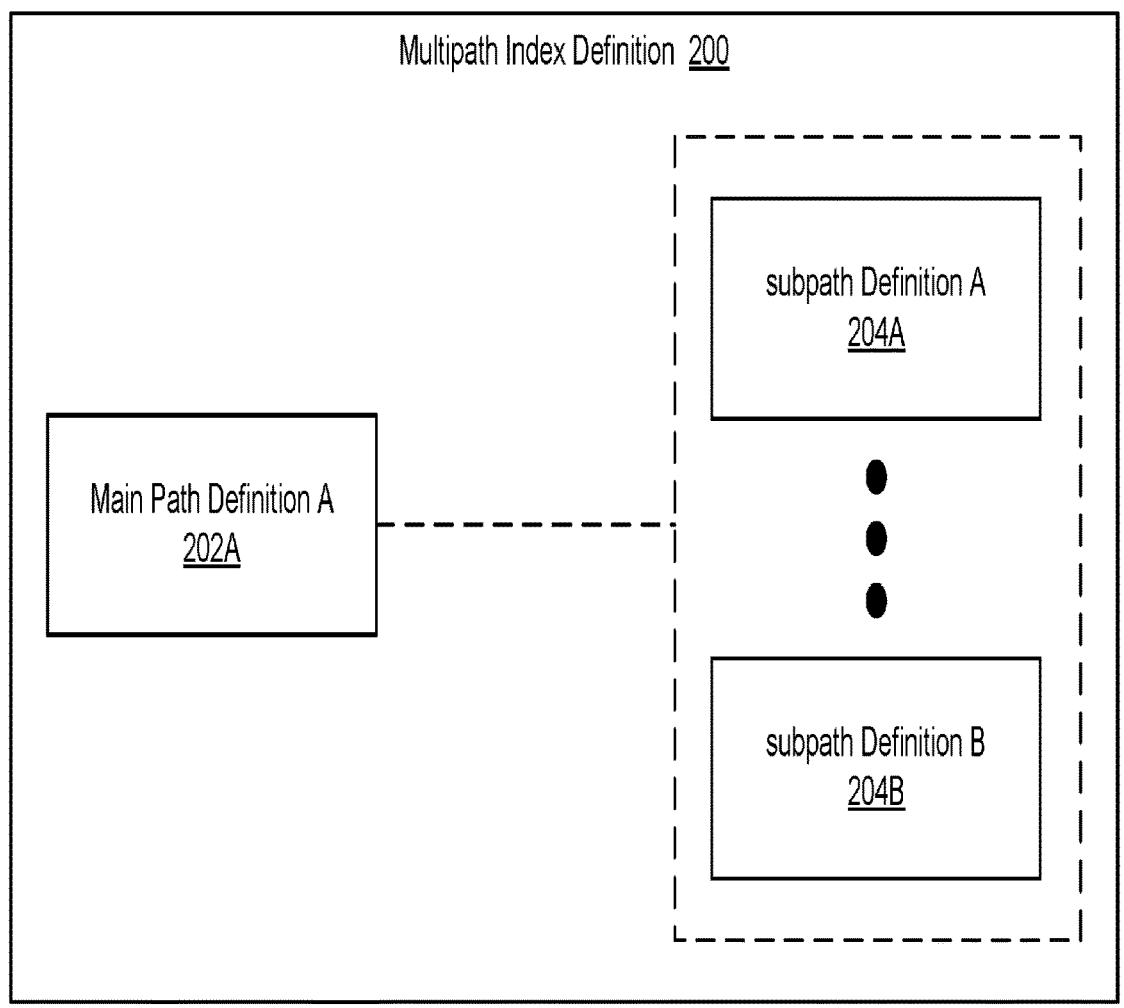
FIG. 2A shows an exemplary multipath index definition in accordance with one or more embodiments of the technology.

Continuing with the discussion of the technology, FIG. 2A shows an exemplary multipath index definition in accordance with one or more embodiments of the technology. The multipath index definition (200) includes a main path definition (202A) that identifies the root element pointed to by the index. The root element may represent a single document, a specific collection of documents and/or an entire database. In addition, the multipath index definition includes one or more subpath definitions (204A, 204B).

Figure 2B:
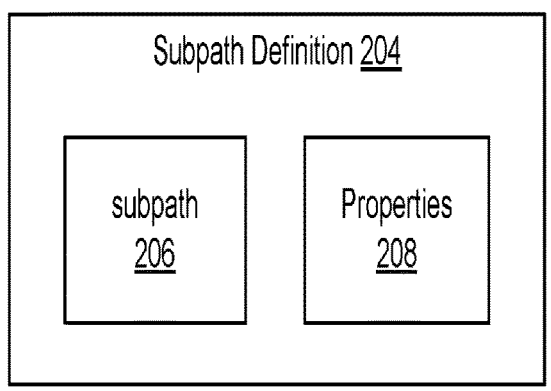
FIG. 2B shows an exemplary subpath definition in accordance with one or more embodiments of the technology.

FIG. 2B shows an exemplary subpath definition in accordance with one or more embodiments of the technology. The subpath definition (204) specifies a subpath (206) (i.e., a subpath defined relative to a main path) and properties (204) associated with the subpath. The properties may include, but are not limited to, (i) value comparison, which indicates that the content associated with the subpath may be used to identify one or more subpath index entries (see e.g., FIG. 3C) and (ii) covering, which indicates that the content associated with the subpath is stored in a subpath index entry (see e.g., FIG. 3C). In one embodiment of the technology, when a subpath only has a property of covering=true (i.e., it is not associated with a property of value comparison=true), the subpath may be used to generate a final result from the initial results but may not be used to generate the initial result set (see e.g., FIG. 6).

Example 2: Main Path and Subpath Definition

The following is an example of a main path definition and a subpath definition for the structured document shown in Example 1. The example is not intended to limit the scope of the technology.

In this example, the main path definition for the structured document shown in Example 1 is: "/baseball/master/player." Further, an exemplary subpath definition for the structured document may be as follows:

| | Properties | |
|---|---|---|
| subpath | covering | value comparison |
| <birthcountry> | False | True |
| <birthcity> | true | False |
| <birthyear> | true | False |

In this example, the subpath <birthcountry> may be used to identify subpath index entries that should be included in an initial result set. In contrast, the subpaths <birthcity> and <birthyear> will not be used to identify subpath index entries that should be included in an initial result set; rather, the content (also referred to as values) associated with these subpaths will be included in subpath index entries.

Figure 3A:
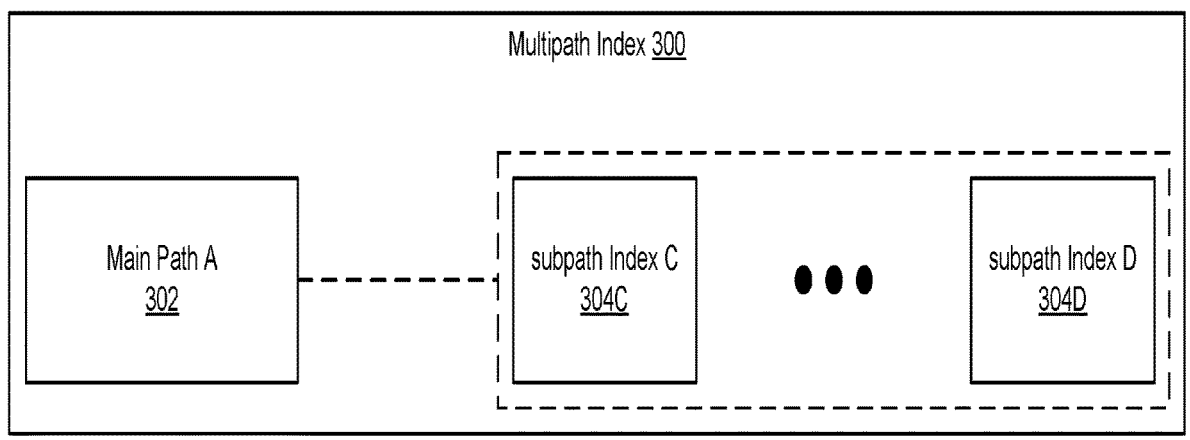
FIG. 3A shows a multipath index in accordance with one or more embodiments of the technology.
Figure 3B:
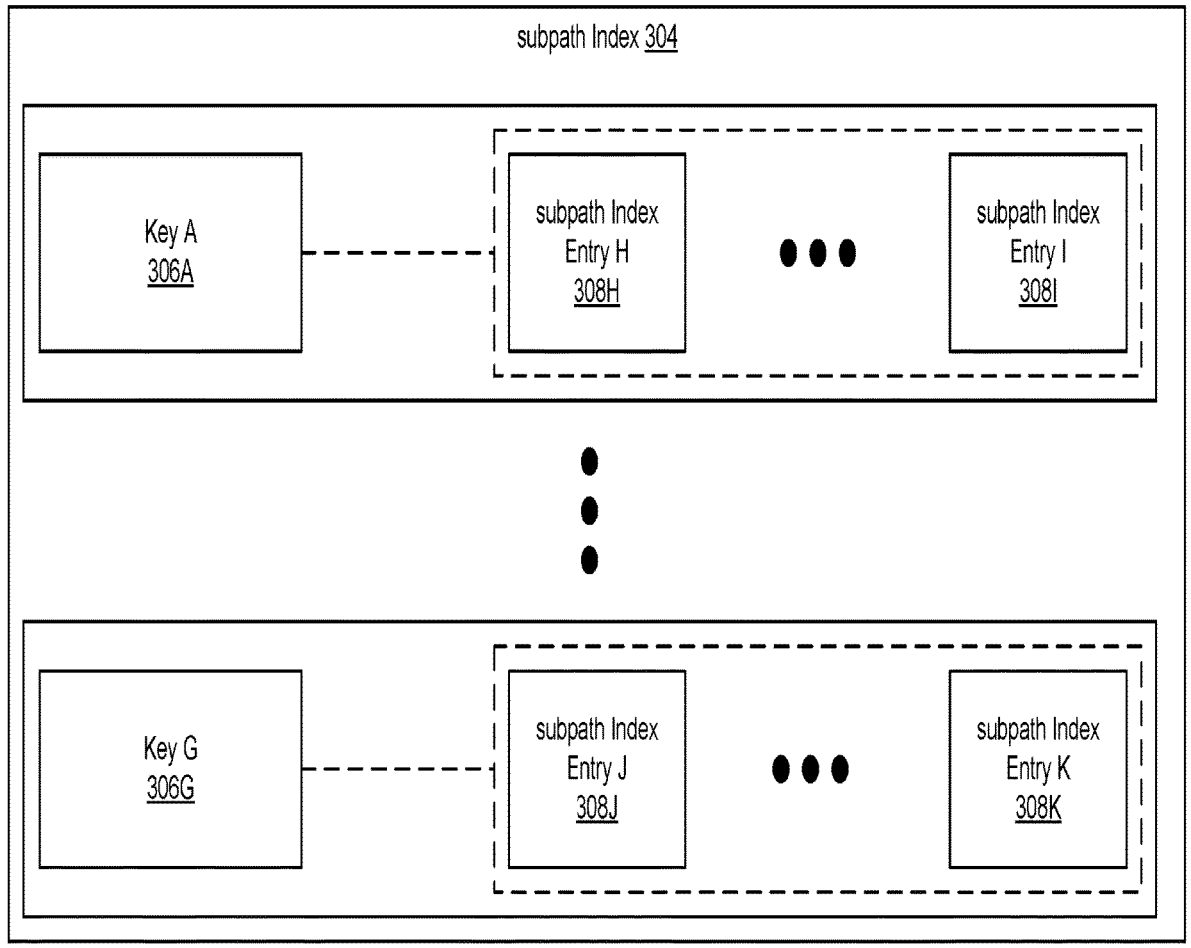
FIG. 3B shows a subpath index in accordance with one or more embodiments of the technology.

FIG. 3A shows a multipath index in accordance with one or more embodiments of the technology. The multipath index (300) includes a main path (302). The main path included in the multipath index corresponds to the main paths specified in the main path definition (See e.g., FIG. 2A). The main path is associated with one or more subpath indices (304C, 304D). Each subpath index is generated using one of the subpath index definitions associated with the main path (see e.g., FIGS. 2A, 2B). Referring to FIG. 3B, each subpath index includes one or more keys (306A, 306G), where each key is associated with one or more subpath index entries (308H, 308I 308J, 308K).

In one embodiment of the technology, the key corresponds to content extracted from a document (e.g., a structured document) that is associated with the subpath. In one embodiment of the technology, the key only corresponds to content associated with subpaths that have a property of value comparison.

Figure 3C:
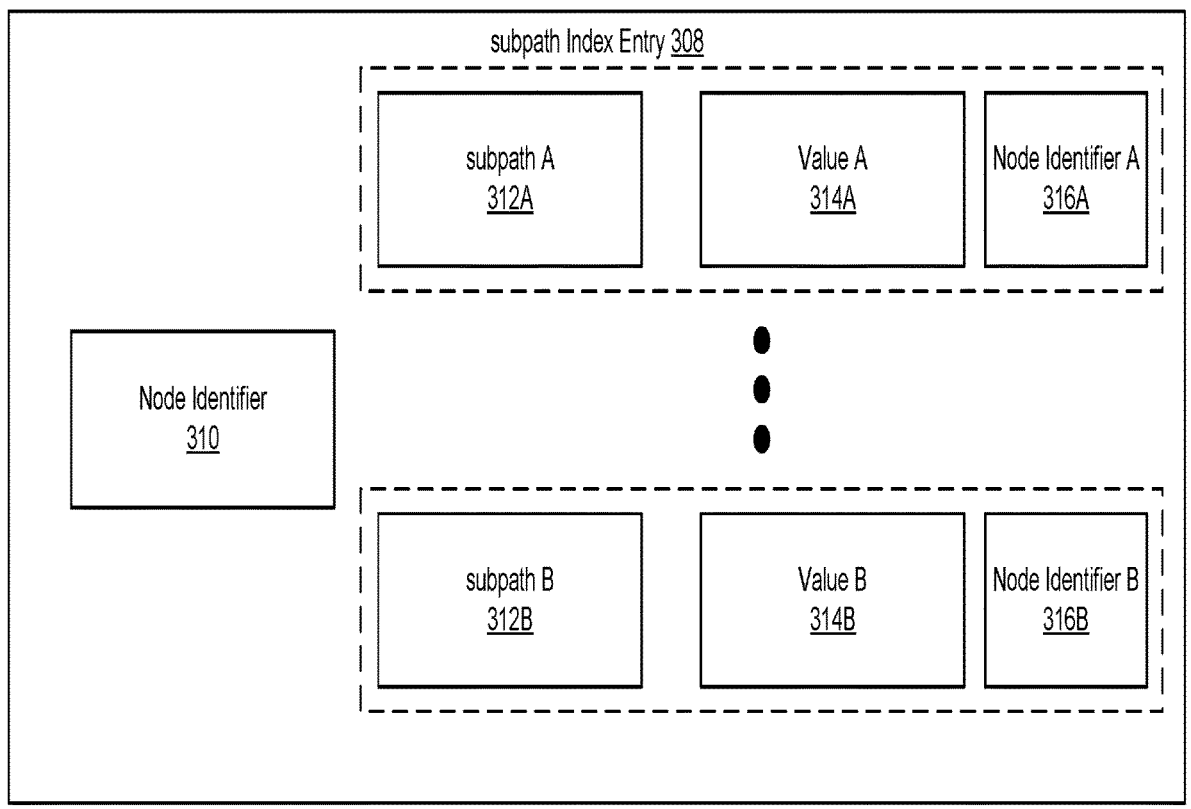
FIG. 3C shows a subpath index entry in accordance with one or more embodiments of the technology.

Referring to FIG. 3C, each subpath index entry (308) in accordance with one or more embodiments of the technology includes: (i) a node identifier (310) for a document (i.e., a document that includes subpath upon which the subpath index is based) and (ii) one or more tuples, where each tuple includes a subpath (312A, 312B), a value (extracted from a document) associated with the subpath (314A, 314B), and a node identifier (316A, 316B) for the subpath (312A, 312B). The node identifiers (310, 316A 316B) allow direct access to the document and/or content within a document (i.e., a document that is stored in the storage, see e.g., FIG. 1).

Example 3: Subpath Index and Subpath Index Entry

The following example is not intended to limit the scope of the technology.

Turning to the example, consider a scenario where the storage includes the structured document shown in Example 1 and the multipath index definition shown in Example 2. Based on the above, the following is an exemplary subpath index.

| Key | Subpath Index Entries |
|---|---|
| "USA" | SIE1, SIE2, SIE3, SIE4, SIE5 |
| "Venezuela" | SIE6, SIE7 |
| "Cuba" | SIE3, SIE4, SIE5 |

As shown above, the exemplary subpath index includes keys and corresponding subpath index entries. For example, the key="USA" is associated with five subpath index entries (i.e., SIE1, SIE2, SIE3, SIE4, SIE5). Each of the subpath index entries associated with a given key (e.g., USA) corresponds to a document that includes the subpath (in this example, <birthcountry>) with a value corresponding to the key (in this example, USA).

Assuming that SIE1 is associated with the structured document shown in Example 1, then SIE1 may have the following content:

| | Node Identifier 17592216557571 | |
|---|---|---|
| Subpath | Value | Node Identifier |
| <birthcity> | "Denver" | 17592216557584 |
| <birthyear> | 1981 | 17592216557574 |

In SIE1, the node identifier: "17592216557571" corresponds to the document shown in Example 1. Further, the value "Denver" is extracted from the aforementioned document from the subpath <birthcity> and the value "1981" is extracted from subpath <birthyear>. Finally, node identifier 17592216557584 is associated with subpath <birthcity> in the document shown in Example 1 and the node identifier 7592216557574 is associated with the subpath <birthyear> in the document shown in Example 1.

FIGS. 4-6 show flowcharts in accordance with one or more embodiments of the technology. While the various steps in these flowcharts are presented and described sequentially, one of ordinary skill in the art will appreciate that some or all of the steps may be executed in different orders, may be combined or omitted, and some or all of the steps may be executed in parallel.

FIG. 4 shows a flowchart for generating a multipath definition in accordance with one or more embodiments of the technology.

In step 400, the main path is determined for one or more structured documents. Specifically, the root element of the structured documents is determined. (See e.g., main path in Example 1).

In step 402, one or more subpaths are selected to be included in the multipath index. In one embodiment of the technology, some or all of the subpaths associated with a given structured document (or set of structured documents) may be included. Returning to Example 1 above, the structured document includes seven subpaths; however, as shown in Example 2 above, only three subpaths were selected for inclusion in the multipath index definition.

In step 404, subpath definitions are obtained for each of the selected subpaths. More specifically, for each subpath selected in step 402, values for one or more properties for each subpath are specified in order to generate a subpath definition for each subpath, see e.g., FIG. 2).

In step 406, the multipath index definition is generated by combining the obtained main path definition and subpath definitions.

FIG. 5 shows a flowchart for generating a multipath index in accordance with one or more embodiments of the technology.

In step 500, the main path is obtained from the multipath definition.

In step 502, a subpath that has a property of "value comparison" set as "true" in the multipath definition is selected. The process in step 502 includes evaluating the subpath path definitions that are associated with the main path obtained in step 500.

In step 504, a subpath index for the selected subpath is created. Creating the subpath index may include: (i) identifying structured documents that include the selected subpath, (ii) for each document identified in (i), obtaining values associated with the selected subpath from the structured documents, (iii) for each document in (i) obtain values associated with subpaths specified in the subpath definition that have a property of covering set to true, (iv) creating a subpath index entry (SIE) for each document identified in (i) that includes the values obtained in (iii), and populating the subpath index with the created SIEs, where each SIE is associated with a key corresponding to a value associated with the subpath selected in step 502. The result of step 504 is a subpath index such as the one shown in Example 3.

In step 506, a determination is made about whether there are any additional subpath definitions to process. If there are additional subpaths to process, the method proceeds to step 502; otherwise, the process ends.

FIG. 6 shows a flowchart for processing a search request in accordance with one or more embodiments of the technology.

In step 600, a search request is received from a client, where the search request includes search criteria. In one embodiment of the technology, the search request may be faceted search. Further, the search may be in an XQuery format. Other query formats and/or languages may be used without departing from the technology.

In step 602, the main path and one or more subpaths associated with the request are determined. This determination may be made, for example, by the query engine based on an evaluation of the search request. The subpaths identified in step 602 may be conditional subpaths or facet subpaths. The request may include any number of conditional subpaths and facet subpaths.

In step 604, for the subpaths identified in step 602, the query engine may determine which, if any of the subpaths, have a "covering" property set to true. The processing in step 604 may be performed by evaluating the subpath definitions for the subpaths identified in step 602.

In step 606, the query engine may generate and issue a search query which may be serviced by the multipath index. The search query may specify all or a portion of the criteria included within the search request obtained from the client. More specifically, the search query may specify a subpath and a value, where the subpath has property "value comparison" set to true. This subpath may be referred to as a conditional subpath. In response to the search query, the query engine obtains an initial result set. The initial result set includes zero, one, or more subpath index entries, where each subpath index entry corresponds to a document that includes the aforementioned value for the specified subpath. (See e.g., Example 4 below).

In step 608, a final result is generated using the initial result set. Specifically, the final result may be generated by processing the subpath index entries obtained in step 606, where the processing includes using the subpaths and one or more values associated with the subpath that are stored in the subpath index entries. In one embodiment of the technology, the subpaths used in step 608 correspond to subpaths, where the subpath has property "covering" set to true. These subpaths may be referred to as facet subpaths.

By using the values that are included within the subpath index entries to generate the final result, the query engine does not need to (or only on a limited basis) access the structured documents (or portions thereof) from the storage. In this manner, there is a reduction in latency related to the servicing of search requests. Said another way, using various embodiments of the technology, search requests may be serviced using sequential I/O requests instead of random I/O requests.

In step 610, the final result is provided to the client.

Example 4: Servicing Search Requests

The following is not intended to limit the scope of the technology. Turning to the example, consider a scenario in which a client issues the following request on a set of structure documents that includes baseball data (see e.g., Example 1), where the multipath index corresponds to the multipath index defined in Example 2 with subpath indices and subpath entries shown in Example 3.

Search Request: Calculate two facet counts, 'Birth City' and 'Birth Year', where birth country='USA'. Only show the counts of the 5 Facet values with the highest count. The search request may take the following format:

```
let $birthCityFacet :=
<facet-definition name='Birth City' xmlns="http://expath.org/ns/facet">
  <group-by>
    <subpath>birthcity</subpath>
  </group-by>
  <max-values>5</max-values>
</facet-definition>
let $birthYearFacet :=
<facet-definition name='Birth Year' xmlns="http://expath.org/ns/facet">
  <group-by>
    <subpath>birthyear</subpath>
  </group-by>
  <max-values>5</max-values>
</facet-definition>
let $results := /baseball/master/player[birthcountry ='USA']
return facet:count($results, ($birthCityFacet, $birthYearFacet))
```

Upon receipt of the search request, the query engine may evaluate the search request and issue the following search query to the multipath index:
let $results:=/baseball/master/player[birthcountry='USA']

In the above search request, "birthcountry" is considered a conditional subpath. In response to the search query, the initial set of results includes all subpath index entries that correspond to structured documents where the "birthcountry" specified in the document is "USA". The query engine, which previously determined that the subpaths <birthCity> and <birthYear> have a property "covering" set to true (i.e., that the aforementioned subpaths are facet subpaths), evaluates the subpath index entries in order to determine the facet count values for birthCity and birthYear as specified in the original search request. This processing may be performed without accessing the underlying structured documents. Once the processing is completed, the final result is generated (see below) and sent to the client.

Final Result:

```
facets xmlns="http://expath.org/ns/facet">
  <facet name="Birth City">
    <key value="Chicago" count="376"/>
    <key value="Philadelphia" count="356"/>
    <key value="St. Louis" count="296"/>
    <key value="New York" count="267"/>
    <key value="Brooklyn" count="240"/>
  </facet>
  <facet name="Birth Year">
    <key value="1960" count="172"/>
    <key value="1987" count="170"/>
    <key value="1983" count="170"/>
    <key value="1969" count="166"/>
    <key value="1893" count="166"/>
  </facet>
</facets>
```

Those skilled in the art will appreciate that the technology is not limited to the aforementioned example. Further, the technology may be implemented with non-faceted search requests without departing from the technology.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (700) may be located at a remote location and connected to the other elements over a network (714). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for multipath searches, comprising:
   receiving a multipath index definition for a multipath index, the multipath index definition comprising:
      a main path for the multipath index;
      a first subpath relative to the main path;
      a property associated with the first subpath, the property associated with the first subpath indicating that the first subpath comprises a conditional subpath;
      a second subpath relative to the main path; and
      a property associated with the second subpath;
   generating, according to the multipath index definition, the multipath index for a collection of documents stored on a computer storage medium, comprising:
      obtaining the main path from the multipath index definition;
      selecting the first subpath based on the property associated with the first subpath;
      identifying, from the collection of documents, a first document that includes the first subpath;
      obtaining a first value associated with the first subpath from the first document;
      selecting the second subpath based on the property associated with the second subpath;
      obtaining a first value associated with the second subpath from the first document;
      creating a first subpath index entry for the second subpath, the first subpath index entry for the second subpath comprising the first value associated with the second subpath obtained from the first document and a document identifier for the first document; and
      storing the first subpath index entry in association with a first key in the multipath index, the first key comprising the first value associated with the first subpath obtained from the first document, wherein the first key corresponds to content extracted from a structured document that is associated with the first subpath; and
   using, by a server, the multipath index to service a search query from a client computer.

2. The method of claim 1, wherein generating the multipath index further comprises:
   identifying, from the collection of documents, a second document that includes the first subpath;
   obtaining, from the second document, the first value associated with the first subpath;
   obtaining, from the second document, a second value associated with the second subpath;
   creating a second subpath index entry for the second subpath, the second subpath index entry for the second subpath comprising the second value associated with the second subpath and a document identifier for the second document; and
   storing the second subpath index entry in association with the first key in the multipath index.

3. The method of claim 2, wherein the first subpath index entry comprises a first node identifier identifying a portion of the first document and the second subpath index entry comprises a second node identifier identifying a portion of the second document.

4. The method of claim 2, wherein generating the multipath index further comprises:
   identifying, from the collection of documents, a third document that includes the first subpath;
   obtaining, from the third document, a second value associated with the first subpath;
   obtaining, from the third document, a third value associated with the second subpath;
   creating a third subpath index entry for the second subpath, the third subpath index entry for the second subpath comprising the third value associated with the second subpath and a document identifier for the third document; and
   storing the third subpath index entry in association with a second key in the multipath index, the second key comprising the second value associated with the first subpath.

5. The method of claim 1, wherein generating the multipath index further comprises:
   identifying, from the collection of documents, a second document that includes the first subpath;
   obtaining, from the second document, a second value associated with the first subpath;
   obtaining, from the second document, a second value associated with the second subpath;
   creating a second subpath index entry for the second subpath, the second subpath index entry for the second subpath comprising the second value associated with the second subpath and a document identifier for the second document; and storing the second subpath index entry in association with a second key in the multipath index, the second key comprising the second value associated with the first subpath.

6. The method of claim 1, wherein using the multipath index to service the search query from the client computer comprises:
   identifying that the search query includes the first subpath, the first value associated with the first subpath and the second subpath;
   determine an initial result set that comprises the first subpath index entry using the first value associated with the first subpath to search the multipath index;
   generate a final result by processing the initial result set, including the first subpath index entry.

7. The method of claim 6, wherein the property associated with the first subpath indicates that the first subpath enables identification of subpath index entries to obtain the initial result set in response to the search query and the property associated with the second subpath indicates that the second subpath is configured to generate the final result from the initial result set, but not to generate the initial result set.

8. The method of claim 1, wherein the structured document that is associated with the first subpath is the first document, wherein, in the first document, the second subpath is at a same hierarchical level as the first subpath relative to the main path, wherein the multipath index comprises the main path and a subpath index associated with the main path, and wherein the subpath index comprises the first subpath index entry indexed by the first key.

9. A computer program product comprising a non-transitory, computer-readable medium, storing therein code executable by a computer processor, the code comprising instructions for:
   receiving a multipath index definition for a multipath index, the multipath index definition comprising:
      a main path for the multipath index;
      a first subpath relative to the main path;
      a property associated with the first subpath, the property associated with the first subpath indicating that the first subpath comprises a conditional subpath;
      a second subpath relative to the main path; and
      a property associated with the second subpath;
   generating, according to the multipath index definition, the multipath index for a collection of documents stored on a computer storage medium, comprising:
      obtaining the main path from the multipath index definition;
      selecting the first subpath based on the property associated with the first subpath;
      identifying, from the collection of documents, a first document that includes the first subpath;
      obtaining a first value associated with the first subpath from the first document;
      selecting the second subpath based on the property associated with the second subpath;
      obtaining a first value associated with the second subpath from the first document;
      creating a first subpath index entry for the second subpath, the first subpath index entry for the second subpath comprising the first value associated with the second subpath obtained from the first document and a document identifier for the first document; and
      storing the first subpath index entry in association with a first key in the multipath index, the first key comprising the first value associated with the first subpath obtained from the first document, wherein the first key corresponds to content extracted from a structured document that is associated with the first subpath; and
   using the multipath index to service a search query from a client computer.

10. The computer program product of claim 9, wherein generating the multipath index further comprises:
   identifying, from the collection of documents, a second document that includes the first subpath;
   obtaining, from the second document, the first value associated with the first subpath;
   obtaining, from the second document, a second value associated with the second subpath;
   creating a second subpath index entry for the second subpath, the second subpath index entry for the second subpath comprising the second value associated with the second subpath and a document identifier for the second document; and
   storing the second subpath index entry in association with the first key in the multipath index.

11. The computer program product of claim 10, wherein the first subpath index entry comprises a first node identifier identifying a portion of the first document and the second subpath index entry comprises a second node identifier identifying a portion of the second document.

12. The computer program product of claim 10, wherein generating the multipath index further comprises:
   identifying, from the collection of documents, a third document that includes the first subpath;
   obtaining, from the third document, a second value associated with the first subpath;
   obtaining, from the third document, a third value associated with the second subpath;
   creating a third subpath index entry for the second subpath, the third subpath index entry for the second subpath comprising the third value associated with the second subpath and a document identifier for the third document; and
   storing the third subpath index entry in association with a second key in the multipath index, the second key comprising the second value associated with the first subpath.

13. The computer program product of claim 9, wherein generating the multipath index further comprises:
   identifying, from the collection of documents, a second document that includes the first subpath;
   obtaining, from the second document, a second value associated with the first subpath;
   obtaining, from the second document, a second value associated with the second subpath;
   creating a second subpath index entry for the second subpath, the second subpath index entry for the second subpath comprising the second value associated with the second subpath and a document identifier for the second document; and
   storing the second subpath index entry in association with a second key in the multipath index, the second key comprising the second value associated with the first subpath.

14. The computer program product of claim 9, wherein using the multipath index to service the search query from the client computer comprises:

identifying that the search query includes the first subpath, the first value associated with the first subpath and the second subpath;

determine an initial result set that comprises the first subpath index entry using the first value associated with the first subpath to search the multipath index;

generate a final result by processing the initial result set, including the first subpath index entry.

15. The computer program product of claim 13, wherein the property associated with the first subpath indicates that the first subpath enables identification of subpath index entries to obtain the initial result set in response to the search query and the property associated with the second subpath indicates that the second subpath is configured to generate the final result from the initial result set, but not generation of the initial result set.

16. The computer program product of claim 9, wherein the structured document that is associated with the first subpath is the first document, wherein, in the first document, the second subpath is at a same hierarchical level as the first subpath relative to the main path, wherein the multipath index comprises the main path and a subpath index associated with the main path, and wherein the subpath index comprises the first subpath index entry indexed by the first key.

17. A method for multipath searches, comprising:
receiving a multipath index definition for a multipath index, the multipath index definition comprising:
a main path for the multipath index; and
a plurality of subpaths relative to the main path;
generating, according to the multipath index definition, the multipath index for a collection of documents stored on a computer storage medium, comprising:
obtaining the main path from the multipath index definition;
selecting a first subpath of the plurality of subpaths, the first subpath associated with a property indicating that the first subpath comprises a conditional subpath;
identifying, from the collection of documents, documents that include the first subpath;
obtaining values for the first subpath from the documents identified as including the first subpath;
obtaining values for the plurality of subpaths, other than the first subpath, from the documents identified as including the first subpath;
creating subpath index entries for the documents identified as including the first subpath, comprising creating for each document from the documents identified as including the first subpath, a subpath index entry that includes values for the plurality of subpaths, other than the first subpath, obtained from that document; and populating the multipath index with the created subpath index entries, wherein each subpath index entry in the multipath index is associated with a key comprising a value associated with the first subpath obtained from the document for which the subpath index entry is created, wherein the key corresponds to content extracted from a structured document that is associated with the first subpath; and using, by a server, the multipath index to service a search query from a client computer, wherein using the multipath index to service the search query from the client computer comprises generating an initial result set that comprises subpath index entries identified from the multipath index as having an associated key that corresponds to a search value associated with the first subpath, wherein the property associated with the first subpath indicates that the first subpath is configured to identify the subpath index entries to obtain the initial result set in response to the search query.

18. The method of claim 17, wherein using the multipath index to service the search query from the client computer comprises:
identifying that the search query includes
the first subpath,
a second subpath, the second subpath included in the plurality of subpaths, other than the first subpath, and
the search value associated with the first subpath; and
generating a final result by processing the initial result set.

19. The method of claim 18, wherein the multipath index definition comprises a property associated with each of the plurality of subpaths, other than the first subpath, wherein the property associated with each of the plurality of subpaths, other than the first subpath indicates that each of the plurality of subpaths, other than the first subpath, is configured to generate the final result from the initial result set, but not generation of the initial result set.

20. The method of claim 18, wherein the search query includes indicators indicating parameters for processing the initial result set to generate the final result.

21. The method of claim 18, wherein generating the final result comprises determining facet counts for the plurality of subpaths, other than the first subpath.

22. The method of claim 17, wherein the multipath index comprises the main path and a subpath index associated with the main path, and wherein the subpath index comprises the subpath index entries created for the documents identified as including the first subpath, the subpath index entries indexed by the values associated with the first subpath obtained from the documents identified as including the first subpath.

* * * * *